US009448345B2

(12) United States Patent
Hassan et al.

(10) Patent No.: US 9,448,345 B2
(45) Date of Patent: Sep. 20, 2016

(54) SILVER BARRIER MATERIALS FOR LOW-EMISSIVITY APPLICATIONS

(71) Applicants: Intermolecular Inc., San Jose, CA (US); Guardian Industries Corp.

(72) Inventors: Mohd Fadzli Anwar Hassan, San Francisco, CA (US); Brent Boyce, Novi, MI (US); Guowen Ding, San Jose, CA (US); Minh Huu Le, San Jose, CA (US); Zhi-Wen Wen Sun, Sunnyvale, CA (US); Yu Wang, San Jose, CA (US); Yongli Xu, Plymouth, MI (US)

(73) Assignees: Intermolecular, Inc., San Jose, CA (US); Guardian Industries Corp., Auburn Hills, MI (US)

( * ) Notice: Subject to any disclaimer, the term of this patent is extended or adjusted under 35 U.S.C. 154(b) by 146 days.

(21) Appl. No.: 13/725,126

(22) Filed: Dec. 21, 2012

(65) Prior Publication Data

US 2014/0177042 A1 Jun. 26, 2014

(51) Int. Cl.
| | |
|---|---|
| *G02B 5/28* | (2006.01) |
| *F21V 9/00* | (2015.01) |
| *G02B 5/20* | (2006.01) |
| *C03C 17/36* | (2006.01) |

(52) U.S. Cl.
CPC ............. *G02B 5/208* (2013.01); *C03C 17/366* (2013.01); *G02B 5/282* (2013.01); *C03C 17/36* (2013.01)

(58) Field of Classification Search
CPC ............... C03C 17/36–17/3655; G02B 5/223; G02B 5/226
See application file for complete search history.

(56) References Cited

U.S. PATENT DOCUMENTS

| | | | |
|---|---|---|---|
| 5,591,529 A | 1/1997 | Braatz et al. | |
| 5,935,702 A * | 8/1999 | Macquart et al. | 428/336 |
| 6,667,121 B2 | 12/2003 | Wang | |
| 6,800,179 B2 | 10/2004 | Wang | |
| 7,688,495 B2 * | 3/2010 | Tonar et al. | 359/265 |
| 2012/0225304 A1 * | 9/2012 | Imran et al. | 428/433 |

OTHER PUBLICATIONS

K. Cenzual, A. Palenzona, and E. Parthe, Dy5Ru2 and Y5Ru2 with Mn5C2-Type Structure, 1980, Acta Cryst, B36, 1631-1634.*
Giorgio Concas, et. al., Magnetic Properties and Electronic Structures of Compounds from the Hf—Co Phase System, 2007, Z. Naturforsch. 62a, 452-456.*

(Continued)

*Primary Examiner* — Scott J Sugarman
*Assistant Examiner* — Robert E Tallman

(57) ABSTRACT

A method for making low emissivity panels, including control the composition of a barrier layer formed on a thin conductive silver layer. The barrier structure can include an alloy of a first element having high oxygen affinity with a second element having low oxygen affinity. The first element can include Ta, Nb, Zr, Hf, Mn, Y, Si, and Ti, and the second element can include Ru, Ni, Co, Mo, and W, which can have low oxygen affinity property. The alloy barrier layer can reduce optical absorption in the visible range, can provide color-neutral product, and can improve adhesion to the silver layer.

20 Claims, 5 Drawing Sheets

(56) References Cited

OTHER PUBLICATIONS

Stefan Wurster, Bernd Gludovatz, Andreas Hoffmann Reinhard Pippan; Fracture behaviour of tungsten—vanadium and tungsten—tantalum alloys and composites, 2011, Jurnal of nuclear Materials, 413, 166-176.*

Schaefer, C., et al.; Low Emissivity Coatings on Architectural Glass; Jan. 1, 1997; Z—Book—Elsevier; Surface and Coatings Technology pp. 3745.

* cited by examiner

SILVER BARRIER MATERIALS FOR LOW-EMISSIVITY APPLICATIONS

FIELD OF THE INVENTION

The present invention relates generally to films providing high transmittance and low emissivity, and more particularly to such films deposited on transparent substrates.

BACKGROUND OF THE INVENTION

Sunlight control glasses are commonly used in applications such as building glass windows and vehicle windows, typically offering high visible transmission and low emissivity. High visible transmission can allow more sunlight to pass through the glass windows, thus being desirable in many window applications. Low emissivity can block infrared (IR) radiation to reduce undesirable interior heating.

In low emissivity glasses, IR radiation is mostly reflected with minimum absorption and emission, thus reducing the heat transferring to and from the low emissivity surface. Low emissivity, or low-e, panels are often formed by depositing a reflective layer (e.g., silver) onto a substrate, such as glass. The overall quality of the reflective layer, such as with respect to texturing and crystallographic orientation, is important for achieving the desired performance, such as high visible light transmission and low emissivity (i.e., high heat reflection). In order to provide adhesion, as well as protection, several other layers are typically formed both under and over the reflective layer. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

One known method to achieve low emissivity is to form a relatively thick silver layer. However, as the thickness of the silver layer increases, the visible light transmission of the reflective layer is reduced, as is manufacturing throughput, while overall manufacturing costs are increased. Therefore, is it desirable to form the silver layer as thin as possible, while still providing emissivity that is suitable for low-e applications.

SUMMARY OF THE DISCLOSURE

In some embodiments, the present invention discloses a barrier structure, and method for forming the same, for an infrared reflective layer to be used in low emissivity coatings. The barrier structure can include an alloy of a first element having high oxygen affinity with a second element having low oxygen affinity. The high oxygen affinity property of the first element can prevent oxidation of the infrared reflective layer by attracting oxygen, for example, from the deposition of subsequent layers or from the subsequent high temperature processes. The low oxygen affinity property of the second element can improve adhesion with the infrared reflective layer. The ratio of the first and second elements can be optimized, for example, the amount of the second element can be minimal, selected to achieve adequate adhesion. The amount of the first element can be maximized, selected to achieve the oxygen diffusion barrier.

In some embodiments, the present invention discloses a barrier structure for a silver infrared reflective layer. The barrier structure can include an alloy of at least two elements. The first element can include Ta, Nb, Zr, Hf, Mn, Y, Si, and Ti, which can have high oxygen affinity property. The second element can include Ru, Ni, Co, Mo, and W, which can have low oxygen affinity property.

The barrier layer can reduce optical absorption in the visible range, providing higher transmission, for example, through the elimination of Cr from the industry-standard NiCr barrier material. Further, more color-neutral product can be achieved, for example, by minimizing reactivity of Ti—Ag at the interface, such as through reducing the concentration of Ti from 100% to a different binary alloy, or through completely eliminating Ti. In addition, adhesion can be improved, e.g., compared to Ti, due to the existence of an element with lower oxygen affinity to maintain good adhesion to Ag.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION OF THE DISCLOSURE

Figure 1A:
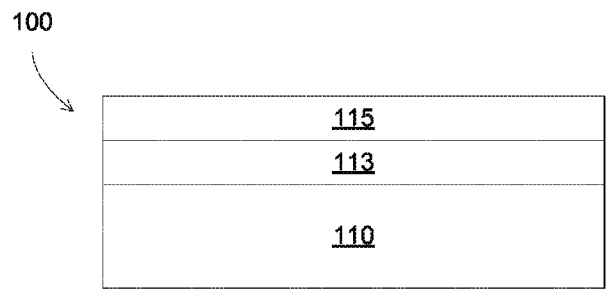
FIG. 1A illustrates an exemplary thin film coating according to some embodiments of the present invention.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, methods and apparatuses for making coated panels are disclosed. The coated panels can include coated layers formed thereon, such as a low resistivity thin infrared reflective layer having a conductive material such as silver. The infrared reflective layer can include a conductive material, with the percentage of reflectance proportional to the conductivity. Thus a metallic layer, for example silver, can be used as infrared reflective layer in low emissivity coatings. To maintain the conductivity of the infrared reflective layer, e.g., silver layer, for example, against oxidation from deposition of subsequent layers or from subsequent high temperature anneals, a barrier layer can be formed on the silver layer.

In some embodiments, methods and apparatuses for making low emissivity coated panels, which include depositing a barrier layer on a conductive layer such as silver in such conditions so that the resistivity of silver, and consequently the emissivity of the coated panels, is optimum are disclosed. For example, the low resistive silver layer or the low emissivity panel can be achieved by a barrier layer including material components having different properties so that an alloy of these components can exhibit a compromise behavior that offers a balance between the good and bad properties from each of the components.

In some embodiments, barrier layers for a conductive layer, wherein the barrier layers can include an alloy of two elements having different oxygen affinity are disclosed. The element with higher oxygen affinity can attract oxygen from the infrared reflective layer, preventing oxidation of the infrared reflective layer. The element with lower oxygen affinity can be bonded with the infrared reflective layer, for example, at the interface, to improve adhesion of the barrier layer with the infrared reflective layer. The combination of two elements with different oxygen affinity can result in a balance between low optical absorption, and good adhesion of the barrier material to Ag, since adhesion of Ag can be better on metallic layers.

In some embodiments, the barrier layer can include an alloy of two elements in which one element has higher oxygen affinity than the other. In some embodiments, the barrier layer can include an alloy of two elements in which a first element has high oxygen affinity, and a second element has low oxygen affinity. For example, the first element can have enthalpy of oxide formation greater than about 1200 kJ/mol, greater than about 1000 kJ/mol, or greater than about 800 kJ/mol in magnitude. The second element can have enthalpy of oxide formation less than about 1000 kJ/mol, less than about 800 kJ/mol, or less than about 600 kJ/mol in magnitude. In some embodiments, the barrier includes an alloy of two metallic elements, in which the first metallic element has formation enthalpy of metal oxide to be in the top 30%, top 20%, or top 10% among all the metal oxides, and the second metallic element has formation enthalpy of metal oxide to be in the bottom 30%, top 20%, or top 10% among all the metal oxides.

In some embodiments, the barrier alloy can include a different percentage of the high and low oxygen affinity elements, such as the percentage of the high oxygen affinity element is greater than that of the low oxygen affinity element. For example, the percentage of the high oxygen affinity element can be between 90 and 10 wt %, such as between 85 and 50 wt %. The percentage of the low oxygen affinity element can be between 10 and 90 wt %, such as between 15 and 50 wt %.

In some embodiments, additional requirements can be imposed on the elements of the barrier alloy to improve low emissivity of the coated layers. For example, the elements can be selected to have low or no solubility in silver, e.g., the material for the infrared reflective layer. The low solubility property can minimize any reactivity between Ag and barrier layer at the interfaces of the silver and the barrier layers. The solubility of the elements in silver can be negligible, or can be less than about 100 ppm by weight. Further, the elements can be selected to have low extinction coefficient in its metallic form and in its oxide form. The low extinction coefficient property can reduce absorption of the incoming light, such as in the visible range. In some embodiments, the elements can have extinction coefficient less than about 8, or can be less than about 5 or 6.

In some embodiments, the barrier layer can include an alloy of metal elements that can have high oxygen affinity, e.g., to prevent oxidation of the infrared reflective material, together with low reactivity, e.g., low solubility, with the infrared reflective material, and low absorption, e.g., in the infrared and visible frequency range, in both metallic and metal oxide forms. The alloy elements can include elements that can have low oxygen affinity, e.g., to improve adhesion with the infrared reflective material, together with low reactivity and low absorption.

In some embodiments, the high oxygen affinity elements can include Ta, Nb, Zr, Hf, Mn, Y, Si, and Ti, with enthalpy of oxide formation greater than about 1200 kJ/mol. The low oxygen affinity elements can include Ru, Ni, Co, Mo, and W, with enthalpy of oxide formation less than about 500 kJ/mol.

In some embodiments, alloys of elements in which the element having high oxygen affinity is higher than the element having low oxygen affinity are disclosed. The percentage of the element having low oxygen affinity can be selected to achieve improved adhesion with the infrared reflective layer, e.g., silver layer, and can have a concentration less than 50 wt % or less than 35 wt %. In some embodiments, the concentration can be between 10 wt % and 90 wt %, between 15 wt % and 50 wt %, or between 15 wt % and 35 wt %. The percentage of the element having high oxygen affinity can be selected to prevent oxidation of the infrared reflective layer, e.g., silver layer, and can have a concentration greater than 50 wt % or greater than 65 wt %. In some embodiments, the concentration can be between 90 wt % and 10 wt %, between 85 wt % and 50 wt %, or between 85 wt % and 65 wt %. As an example, the barrier material could be 10 wt % W-90 wt % Ti, or 30 wt % W-70 wt % Ti.

The barrier layer can improve the low emissivity coated panels, for example, by reducing absorption in the visible range, e.g., allowing high transmission of visible light, minimizing or eliminating reactivity with Ag, which can prevent degradation of the color of the coated system, resulting in color-neutral panels, and improving adhesion between Ag and the top barrier layer.

In some embodiments, methods and apparatuses for making low emissivity panels which include a low resistivity thin infrared reflective layer including a conductive material such as silver, gold, or copper are disclosed. The thin silver layer can be thinner than 10 nm, such as 7 or 8 nm. The silver layer can have low roughness, and is preferably deposited on a seed layer also having low roughness. The low emissivity panels can have improved overall quality of the infrared reflective layer with respect to conductivity, physical roughness and thickness. For example, the methods allow for improved conductivity of the reflective layer such that the thickness of the reflective layer may be reduced while still providing desirably low emissivity.

In general, the reflective layer preferably has low sheet resistance, since low sheet resistance is related to low emissivity. In addition, the reflective layer is preferably thin to provide high visible light transmission. Thus in some embodiments, methods and apparatuses to deposit a thin and highly conductive reflective layer, providing a coated layer with high visible transmittance and low infrared emissivity are disclosed. The methods can also maximize volume production, throughput, and efficiency of the manufacturing process used to form low emissivity panels.

In some embodiments, improved coated transparent panels, such as a coated glass, that has acceptable visible light transmission and IR reflection are disclosed. Methods of producing the improved, coated, transparent panels, which comprise specific layers in a coating stack are also disclosed.

The coated transparent panels can include a glass substrate or any other transparent substrates, such as substrates made of organic polymers. The coated transparent panels can be used in window applications such as vehicle and building windows, skylights, or glass doors, either in monolithic glazings or multiple glazings with or without a plastic interlayer or a gas-filled sealed interspace.

FIG. 1A illustrates an exemplary thin film coating according to some embodiments. A barrier layer 115 is disposed on an infrared reflective layer 113, such as a silver layer, which is disposed on a substrate 110 to form a coated transparent panel 100, which has high visible light transmission, and low IR emission.

The layer 115 can be sputtered deposited using different processes and equipment, for example, the targets can be sputtered under direct current (DC), pulsed DC, alternate current (AC), radio frequency (RF) or any other suitable conditions. In some embodiments, physical vapor deposition methods for depositing a layer 115 with minimum affect on the infrared reflective layer 113 are disclosed.

The infrared reflective layer can include a conductive material, with the percentage of reflectance proportional to the conductivity. Metals are typically used as infrared reflective layers, with silver offering between 95-99% and gold 98-99% reflectivity in the infrared region. Thus a metallic layer, for example silver, can be used as infrared reflective layer in low emissivity coatings. The deposition of the silver layer can be optimized to obtain high conductivity, for example, by minimizing the impurities in the silver layer.

For the silver layer to be as pure as possible, the layer immediately on top of the silver layer (e.g., the barrier layer) is very important in protecting the silver from oxidation, such as during oxygen reactive sputtering process in the deposition of subsequent layers. In addition, this barrier layer can protect the silver layer against reaction with oxygen diffusion during the glass tempering process, or during long term use where the piece of glass may be exposed to moisture or environment.

To maintain the conductivity of the infrared reflective layer, e.g., silver layer, for example, against oxidation from deposition of subsequent layers or from subsequent high temperature anneals, a barrier layer can be formed on the silver layer. The barrier layer can be an oxygen diffusion barrier, protecting the silver layer from oxygen diffusing through the barrier to the react with the silver layer.

In addition to the oxygen diffusion barrier property, there are other desirable properties for the barrier layer. For example, since the barrier layer is placed directly on the silver layer, low or no solubility of the barrier material in silver is desirable to minimize reactivity between the barrier layer and silver at the interface. The reaction between the barrier layer and silver can introduce impurity to the silver layer, potentially reducing the conductivity.

Further, in the fabrication of low emissivity coating panels, high temperature processes can be used, for example, to anneal the deposited films or to tempering the glass substrate. The high temperature processes can have adverse effects on the low emissivity coating, such as changing the structure or the optical properties, e.g., index of refraction n or absorption coefficient k, of the coated films. Thus thermal stability with respect to optical properties is desirable, for example, barrier material might have low extinction coefficient, e.g., low visible absorption, in both metallic form and oxide form.

In some embodiments, barrier structures, and methods for forming the same, for an infrared reflective layer to be used in low emissivity coatings are disclosed. The barrier structures can be formed on an infrared reflective layer to protect the infrared reflective layer from impurity diffusion, together with exhibiting good adhesion and good optical properties, for example, during the fabrication process.

The barrier structure can include an alloy of a first element having high oxygen affinity with a second element having low oxygen affinity. The high oxygen affinity property of the first element can prevent oxidation of the infrared reflective layer by attracting oxygen, for example, from the deposition of subsequent layers or from the subsequent high temperature processes. The low oxygen affinity property of the second element can improve adhesion with the infrared reflective layer. The first and second elements can form an alloy material, which can exhibit both oxygen gettering from and adhesion bonding with the infrared reflective layer. The ratio of the first and second elements can be optimized, for example, the amount of the second element can be minimal, selected to achieve adequate adhesion. The amount of the first element can be maximized, selected to achieve the oxygen diffusion barrier.

In some embodiments, the alloy barrier layer can provide improvement over industry standard silver barrier, for example, of NiCr or Ti. The alloy barrier can have lower visible absorption, e.g., higher transmission, for example, by selecting elements of the alloy barrier having lower absorption coefficient than Cr. The alloy barrier can have better adhesion, for example, than Ti, by selecting elements of the alloy barrier having lower oxygen affinity than Ti. In addition, elements of the alloy barrier can be selected to provide color neutral coated layers, for example, by having low reactivity with silver.

Thus, in some embodiments, through the selection of alloy elements, the alloy barrier can reduce absorption in the visible range, minimize or eliminate reactivity with silver, and improve the adhesion between silver and the alloy barrier layer.

In some embodiments, barrier structures including an alloy of at least two elements, selected to optimize the low emissivity coatings are disclosed. For example, the elements can be selected to reduce optical absorption, and exhibit structural and appearance stability, in addition to good adhesion and good barrier properties.

In some embodiments, barrier structures for a silver infrared reflective layer are disclosed. The barrier structures can include an alloy of at least two elements. The first element can include Ta, Nb, Zr, Hf, Mn, Y, Si, and Ti, which can have high oxygen affinity property. The second element can be include Ru, Ni, Co, Mo, W, which can have low oxygen affinity property. Metallic elements tend to have better adhesion with silver as compared to metal oxides, thus low oxygen affinity metallic elements can have improve adhesion property as compared to high oxygen affinity metallic elements, since high oxygen affinity metallic elements can be bonded with oxygen to form metal oxides.

In addition, the first and second elements can have low or no solubility in silver, resulting in minimal reaction with silver, leading to minimal degradation of silver conductivity. The first and second elements can have low extinction coefficient in both metallic and metal oxide forms, thus can minimize degradation of light transmission or structural or optical changes due to a high temperature process.

In some embodiments, methods for forming a layer 115 on a high transmittance, low emissivity coated article having a substrate and a smooth metallic reflective film including one of silver, gold, or copper are disclosed. In some embodiments, other layers can be included, such as an oxide layer, a seed layer, a conductive layer, an antireflective layer, or a protective layer.

In some embodiments, coating stacks comprising multiple layers for different functional purposes are disclosed. For example, the coating stacks can comprise a seed layer to facilitate the deposition of the reflective layer, an oxygen diffusion layer disposed on the reflective layer to prevent oxidation of the reflective layer, a protective layer disposed on the substrate to prevent physical or chemical abrasion, or an antireflective layer to reduce visible light reflection. The coating stacks can comprise multiple layers of reflective layers to improve IR emissivity.

Figure 1B:
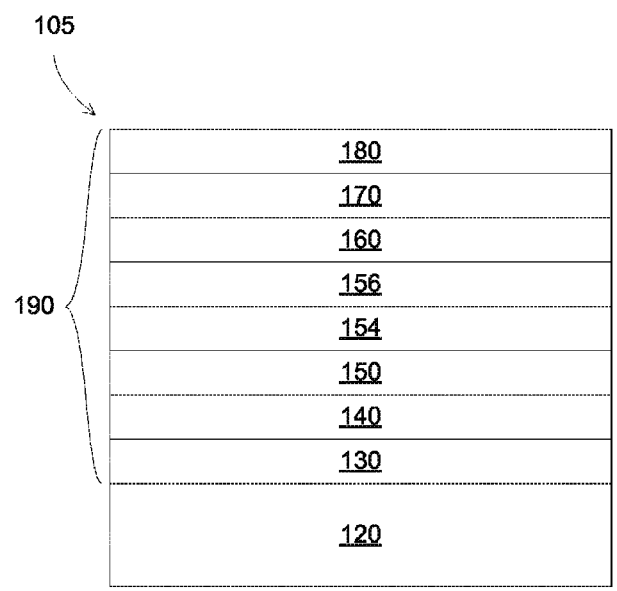
FIG. 1B illustrates a low emissivity transparent panel 105 according to some embodiments of the present invention.

FIG. 1B illustrates a low emissivity transparent panel 105 according to some embodiments. The low emissivity transparent panel can comprise a glass substrate 120 and a low emissivity (low-e) stack 190 formed over the glass substrate 120. The glass substrate 120 in some embodiments is made of a glass, such as borosilicate glass, and has a thickness of, for example, between 1 and 10 millimeters (mm). The substrate 120 may be square or rectangular and about 0.5-2 meters (m) across. In some embodiments, the substrate 120 may be made of, for example, plastic or polycarbonate.

The low-e stack 190 includes a lower protective layer 130, a lower oxide layer 140, a seed layer 150, a reflective layer 154, a barrier layer 156, an upper oxide 160, an optical filler layer 170, and an upper protective layer 180. Some layers can be optional, and other layers can be added, such as interface layers or adhesion layers. Exemplary details as to the functionality provided by each of the layers 130-180 are provided below.

The various layers in the low-e stack 190 may be formed sequentially (i.e., from bottom to top) on the glass substrate 120 using a physical vapor deposition (PVD) and/or reactive (or plasma enhanced) sputtering processing tool. In some embodiments, the low-e stack 190 is formed over the entire glass substrate 120. However, in other embodiments, the low-e stack 190 may only be formed on isolated portions of the glass substrate 120.

The lower protective layer 130 is formed on the upper surface of the glass substrate 120. The lower protective layer 130 can comprise silicon nitride, silicon oxynitride, or other nitride material such as SiZrN, for example, to protect the other layers in the stack 190 from diffusion from the substrate 120 or to improve the haze reduction properties. In some embodiments, the lower protective layer 130 is made of silicon nitride and has a thickness of, for example, between about 10 nm to 50 nm, such as 25 nm.

The lower oxide layer 140 is formed on the lower protective layer 130 and over the glass substrate 120. The lower oxide layer is preferably a metal or metal alloy oxide layer and can serve as an antireflective layer. The lower metal oxide layer 140 may enhance the crystallinity of the reflective layer 154, for example, by enhancing the crystallinity of a seed layer for the reflective layer, as is described in greater detail below.

The layer 150 can be used to provide a seed layer for the IR reflective film, for example, a zinc oxide layer deposited before the deposition of a silver reflective layer can provide a silver layer with lower resistivity, which can improve its reflective characteristics. The seed layer can comprise a metal such as titanium, zirconium, and/or hafnium, or a metal alloy such as zinc oxide, nickel oxide, nickel chrome oxide, nickel alloy oxides, chrome oxides, or chrome alloy oxides.

In some embodiments, the seed layer 150 can be made of a metal, such as titanium, zirconium, and/or hafnium, and has a thickness of, for example, 50 Å or less. Generally, seed layers are relatively thin layers of materials formed on a surface (e.g., a substrate) to promote a particular characteristic of a subsequent layer formed over the surface (e.g., on the seed layer). For example, seed layers may be used to affect the crystalline structure (or crystallographic orientation) of the subsequent layer, which is sometimes referred to as "templating." More particularly, the interaction of the material of the subsequent layer with the crystalline structure of the seed layer causes the crystalline structure of the subsequent layer to be formed in a particular orientation.

For example, a metal seed layer is used to promote growth of the reflective layer in a particular crystallographic orientation. In some embodiments, the metal seed layer is a material with a hexagonal crystal structure and is formed with a (002) crystallographic orientation which promotes growth of the reflective layer in the (111) orientation when the reflective layer has a face centered cubic crystal structure (e.g., silver), which is preferable for low-e panel applications.

In some embodiments, the crystallographic orientation can be characterized by X-ray diffraction (XRD) technique, which is based on observing the scattered intensity of an X-ray beam hitting the layer, e.g., silver layer or seed layer, as a function of the X-ray characteristics, such as the incident and scattered angles. For example, zinc oxide seed layer can show a pronounced (002) peak and higher orders in a 0-2θ diffraction pattern. This suggests that zinc oxide crystallites with the respective planes oriented parallel to the substrate surface are present.

In some embodiments, the terms "silver layer having (111) crystallographic orientation", or "zinc oxide seed layer having (002) crystallographic orientation" include a meaning that there is a (111) crystallographic orientation for the silver layer or a (002) crystallographic orientation for the zinc oxide seed layer, respectively. The crystallographic orientation can be determined, for example, by observing pronounced crystallography peaks in an XRD characterization.

In some embodiments, the seed layer 150 can be continuous and covers the entire substrate. Alternatively, the seed layer 150 may not be formed in a completely continuous manner. The seed layer can be distributed across the substrate surface such that each of the seed layer areas is laterally spaced apart from the other seed layer areas across the substrate surface and do not completely cover the substrate surface. For example, the thickness of the seed layer 150 can be a monolayer or less, such as between 2.0 and 4.0 Å, and the separation between the layer sections may be the result of forming such a thin seed layer (i.e., such a thin layer may not form a continuous layer).

The reflective layer 154 is formed on the seed layer 150. The IR reflective layer can be a metallic, reflective film, such as silver, gold, or copper. In general, the IR reflective film comprises a good electrical conductor, blocking the passage of thermal energy. In some embodiments, the reflective layer 154 is made of silver and has a thickness of, for example, 100 Å. Because the reflective layer 154 is formed on the seed layer 150, for example, due to the (002) crystallographic orientation of the seed layer 150, growth of the silver reflective layer 154 in a (111) crystalline orientation is promoted, which offers low sheet resistance, leading to low panel emissivity.

Because of the promoted (111) textured orientation of the reflective layer 154 caused by the seed layer 150, the conductivity and emissivity of the reflective layer 154 is improved. As a result, a thinner reflective layer 154 may be formed that still provides sufficient reflective properties and visible light transmission. Additionally, the reduced thickness of the reflective layer 154 allows for less material to be used in each panel that is manufactured, thus improving manufacturing throughput and efficiency, increasing the usable life of the target (e.g., silver) used to form the reflective layer 154, and reducing overall manufacturing costs.

Further, the seed layer 150 can provide a barrier between the metal oxide layer 140 and the reflective layer 154 to reduce the likelihood of any reaction of the material of the reflective layer 154 and the oxygen in the lower metal oxide layer 140, especially during subsequent heating processes. As a result, the resistivity of the reflective layer 154 may be reduced, thus increasing performance of the reflective layer 154 by lowering the emissivity.

Formed on the reflective layer 154 is a barrier layer 156, which can protect the reflective layer 154 from being oxidized. For example, the barrier can be a diffusion barrier, stopping oxygen from diffusing into the silver layer from the upper oxide layer 160. The barrier layer 156 can comprise titanium, nickel or a combination of nickel and titanium.

Formed on the barrier layer 156 is an upper oxide layer, which can function as an antireflective film stack, including a single layer or multiple layers for different functional purposes. The antireflective layer 160 serves to reduce the reflection of visible light, selected based on transmittance, index of refraction, adherence, chemical durability, and thermal stability. In some embodiments, the antireflective layer 160 comprises tin oxide, offering high thermal stability properties. The antireflective layer 160 can also include titanium dioxide, silicon nitride, silicon dioxide, silicon oxynitride, niobium oxide, SiZrN, tin oxide, zinc oxide, or any other suitable dielectric material.

The optical filler layer 170 can be used to provide a proper thickness to the low-e stack, for example, to provide an antireflective property. The optical filler layer preferably has high visible light transmittance. In some embodiments, the optical filler layer 170 is made of tin oxide and has a thickness of, for example, 100 Å. The optical filler layer may be used to tune the optical properties of the low-e panel 105. For example, the thickness and refractive index of the optical filler layer may be used to increase the layer thickness to a multiple of the incoming light wavelengths, effectively reducing the light reflectance and improving the light transmittance.

An upper protective layer 180 can be used for protecting the total film stack, for example, to protect the panel from physical or chemical abrasion. The upper protective layer 180 can be an exterior protective layer, such as silicon nitride, silicon oxynitride, titanium oxide, tin oxide, zinc oxide, niobium oxide, or SiZrN.

In some embodiments, adhesion layers can be used to provide adhesion between layers. The adhesion layers can be made of a metal alloy, such as nickel-titanium, and have a thickness of, for example, 30 Å.

Depending on the materials used, some of the layers of the low-e stack 190 may have some elements in common. An example of such a stack may use a zinc-based material in the oxide dielectric layers 140 and 160. As a result, a relatively low number of different targets can be used for the formation of the low-e stack 190.

In some embodiments, the coating can comprise a double or triple layer stack, having multiple IR reflective layers. In some embodiments, the layers can be formed using a plasma enhanced, or reactive sputtering, in which a carrier gas (e.g., argon) is used to eject ions from a target, which then pass through a mixture of the carrier gas and a reactive gas (e.g., oxygen), or plasma, before being deposited.

In some embodiments, the effects of the deposition process of the layers deposited on the silver conductive layer on the quality of the silver conductive layer are disclosed. Since the silver conductive layer is desirably thin, for example, less than 20 nm, to provide high visible light transmission, the quality of the silver conductive layer can be affected by the deposition of the subsequently deposited layer, such as the barrier layer or the antireflective layer.

In some embodiments, sputter deposition processes, which can be applied for a barrier layer deposited on a conductive layer are disclosed. For example, the barrier layer can protect the infrared reflective layer from being oxidized. The oxide layer can function as an antireflective layer. The materials of the barrier layer can reduce reaction for the conductive underlayer such as oxidation, preventing resistivity and emissivity degradation.

In some embodiments, deposition processes, and coated articles fabricated from the process, using a layer having an alloy of a high oxygen affinity material and a low oxygen affinity material during the sputter deposition, for example, to achieve higher quality coated layers and coated panels are disclosed.

In some embodiments, the alloy barrier layer can be sputtered from an alloyed target, or co-sputtered from different elemental targets onto the same substrate. The process may be in pure Ar (which will deposit a pure metallic barrier layer), or may include oxygen to make the film slightly oxidized.

Figure 2A:
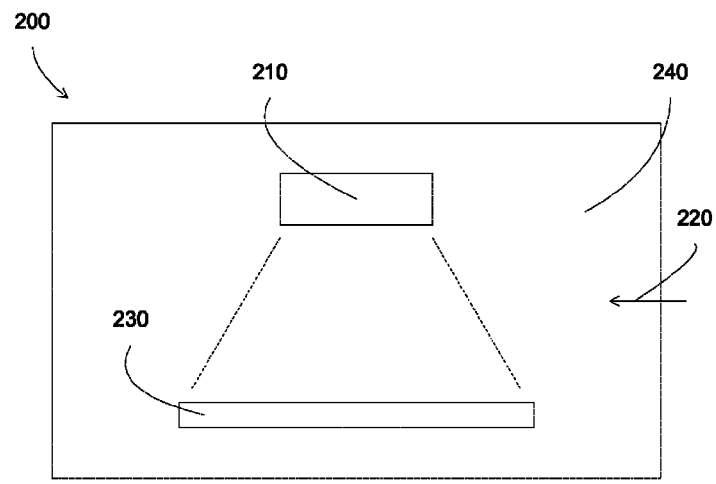
FIGS. 2A-2B illustrate physical vapor deposition (PVD) systems according to some embodiments of the present invention.
Figure 2B:
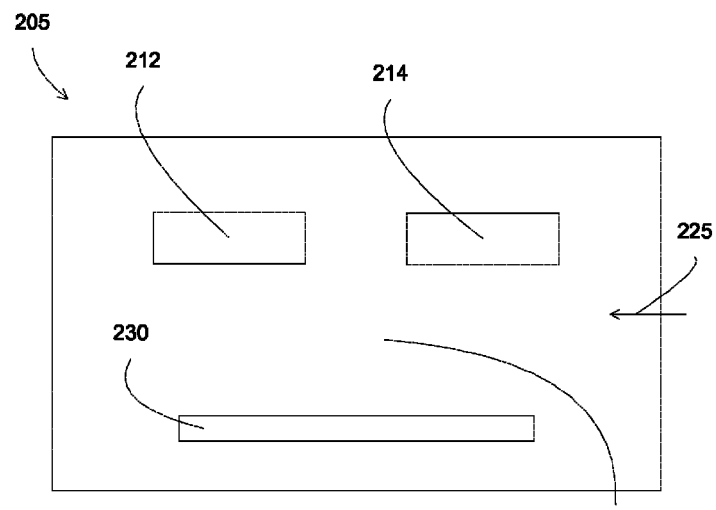

FIGS. 2A-2B illustrate physical vapor deposition (PVD) systems according to some embodiments. In FIG. 2A, a PVD system, also commonly called sputter system or sputter deposition system, 200 includes a housing that defines, or encloses, a processing chamber 240, a substrate 230, a target assembly 210, and reactive species delivered from an outside source 220. During deposition, the target is bombarded with argon ions, which releases sputtered particles toward the substrate 230. The sputter system 200 can perform blanket deposition on the substrate 230, forming a deposited layer that cover the whole substrate, e.g., the area of the substrate that can be reached by the sputtered particles generated from the target assembly 210.

The materials used in the target 210 may, for example, include tin, zinc, magnesium, aluminum, lanthanum, yttrium, titanium, antimony, strontium, bismuth, silicon, silver, nickel, chromium, copper, gold, or any combination thereof (i.e., a single target may be made of an alloy of several metals). Additionally, the materials used in the targets may include oxygen, nitrogen, or a combination of oxygen and nitrogen in order to form the oxides, nitrides, and oxynitrides of the metals described above. Additionally, although only one target assembly 210 is shown, additional target assemblies may be used. As such, different combinations of targets may be used to form, for example, the dielectric layers described above. For example, in some embodiments in which the dielectric material is zinc-tin-titanium oxide, the zinc, the tin, and the titanium may be provided by separate zinc, tin, and titanium targets, or they may be provided by a single zinc-tin-titanium alloy target. For example, the target assembly 210 can comprise a silver target, and together with argon ions to sputter deposit a silver layer on substrate 230. The target assembly 210 can include a metal or metal alloy target, such as tin, zinc, or tin-zinc alloy, and together with reactive species of oxygen to sputter deposit a metal or metal alloy oxide layer.

The sputter deposition system 200 can include other components, such as a substrate support for supporting the substrate. The substrate support can include a vacuum chuck, electrostatic chuck, or other known mechanisms. The substrate support can be capable of rotating around an axis thereof that is perpendicular to the surface of the substrate. In addition, the substrate support may move in a vertical direction or in a planar direction. It should be appreciated that the rotation and movement in the vertical direction or planar direction may be achieved through known drive mechanisms which include magnetic drives, linear drives, worm screws, lead screws, a differentially pumped rotary feed through drive, etc.

In some embodiments, the substrate support includes an electrode which is connected to a power supply, for example, to provide a RF or DC bias to the substrate, or to provide a plasma environment in the process housing 240. The target assembly 210 can include an electrode which is connected to a power supply to generate a plasma in the process housing. The target assembly 210 is preferably oriented towards the substrate 230.

The sputter deposition system 200 can also include a power supply coupled to the target electrode. The power supply provides power to the electrodes, causing material to be, at least in some embodiments, sputtered from the target. During sputtering, inert gases, such as argon or krypton, may be introduced into the processing chamber 240 through the gas inlet 220. In embodiments in which reactive sputtering is used, reactive gases may also be introduced, such as oxygen and/or nitrogen, which interact with particles ejected from the targets to form oxides, nitrides, and/or oxynitrides on the substrate.

The sputter deposition system 200 can also include a control system (not shown) having, for example, a processor and a memory, which is in operable communication with the other components and configured to control the operation thereof in order to perform the methods described herein.

In some embodiments, methods and apparatuses for making layers above the thin low resistive silver layer, including controlling the ion energy on the substrate, so that the deposition is performed at a low ion energy, which can reduce damage to the silver underlayer are disclosed.

FIG. 2B shows a sputter system having co-sputtering targets according to some embodiments. A sputter deposition chamber 205 can include two targets 212 and 214 disposed in a plasma environment 245, containing reactive species delivered from an outside source 225. The targets 212 and 214 can include a first element of the alloy barrier, e.g., Ta, Nb, Zr, Hf, Mn, Y, Si, and Ti and a second element of the alloy barrier, e.g., Ru, Ni, Co, Mo, and W, together with optional reactive species of oxygen to deposit an alloy of barrier layer on substrate 230. This configuration serves as an example, and other sputter system configurations can be used, such as a single target having an alloy material.

In some embodiments, methods and apparatuses for making low emissivity panels, including forming an infrared reflective layer formed under or over a barrier structure that includes an alloy of high oxygen affinity and low oxygen affinity elements are disclosed. The panels can exhibit optimal infrared reflectance, thermal stability and durability, for example, due to the barrier layer protecting the infrared reflective layer while not degrading the low emissivity coating characteristics.

In some embodiments, methods for making low emissivity panels in large area coaters are disclosed. A transport mechanism can be provided to move a substrate under one or more sputter targets, to deposit a conductive layer underlayer before depositing a barrier layer, an antireflective layer, together with other layers such as a surface protection layer.

In some embodiments, in-line deposition systems, including a transport mechanism for moving substrates between deposition stations are disclosed.

Figure 3:
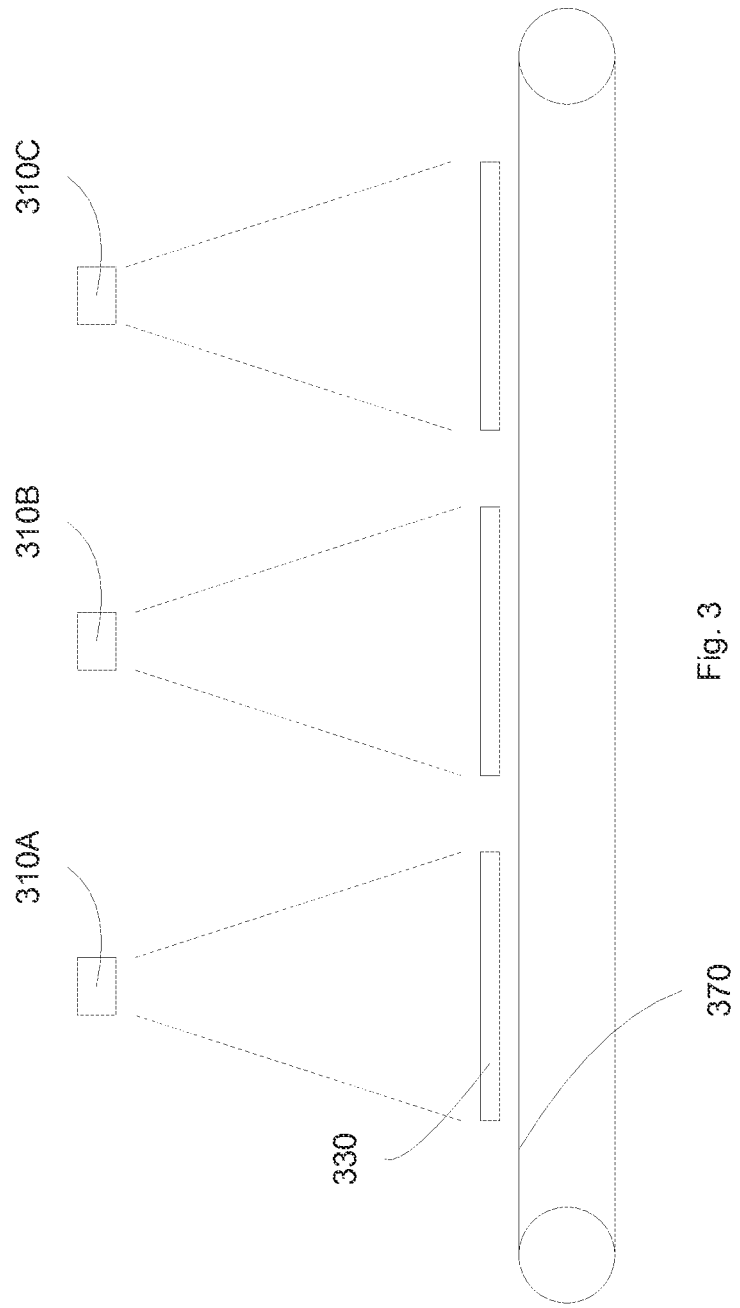
FIG. 3 illustrates an exemplary in-line deposition system according to some embodiments of the present invention.

FIG. 3 illustrates an exemplary in-line deposition system according to some embodiments. A transport mechanism 370, such as a conveyor belt or a plurality of rollers, can transfer substrate 330 between different sputter deposition stations. For example, the substrate can be positioned at station #1, having a target assembly 310A, then transferred to station #2, having target assembly 310B, and then transferred to station #3, having target assembly 310C. The station #1 having target 310A can be a silver deposition station, sputtering an infrared reflective layer having silver. The station #2 having target 310B can be a barrier deposition station, sputtering a metallic alloy having a high oxygen affinity material and a low oxygen affinity material. As shown, the station #2 includes a single target 310B. However, other configurations can be used, such as co-sputtering system utilizing two different targets. The station #3 having target 310C can be used to deposit other layers, such as an antireflective layer or a protection layer.

Figure 4:
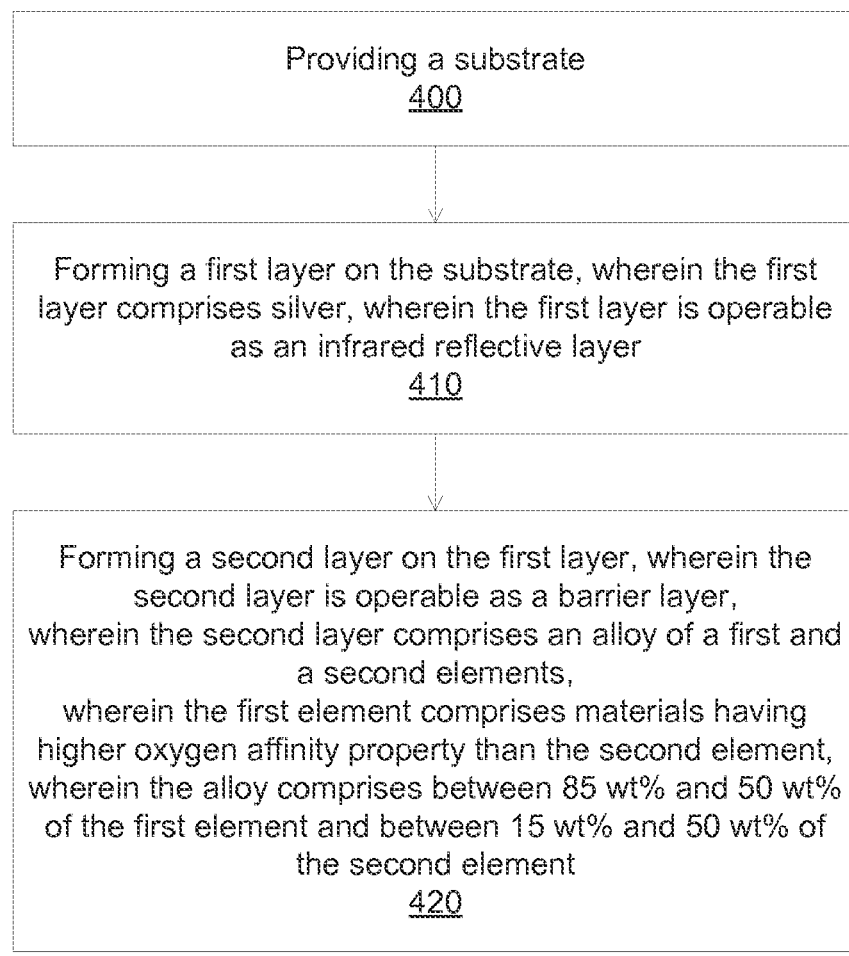
FIG. 4 illustrates a flow chart for sputtering coated layers according to some embodiments of the present invention.

FIG. 4 illustrates a flow chart for sputtering coated layers according to some embodiments. After forming a conductive layer on a substrate, such as a silver layer, a barrier layer can be sputtered deposited on the conductive layer. The barrier layer can include an alloy of first and second elements, wherein the first and second elements can be selected to improve, or at least, not degrade, the conductive layer. For example, the elements can be selected to have low, e.g., less than 100 ppm in weight, or negligible solubility in the material of the conductive layer, to have extinction coefficient less than 5 in both elemental forms and oxide forms. Further, the first and second elements can be selected to have high and low oxygen affinity, respectively.

In operation 400, a substrate is provided. The substrate can be a transparent substrate, such as a glass substrate or a polymer substrate. Other substrates can also be used. In operation 410, a first layer is formed on the substrate. The first layer can be operable as an infrared reflective layer. The first layer can include a conductive material or a metallic material such as silver. The thickness of the first layer can be less than or equal to about 20 nm, or can be less than or equal to about 10 nm.

In operation 420, a second layer is sputter deposited on the first layer. The second layer can be operable as a barrier layer. The second layer can include an alloy of first and second elements. The first element can include materials having higher oxygen affinity than the second element. In some embodiments, the oxygen affinity property can be characterized by free energy or enthalpy of oxide formation. The alloy can have more first element than the second element. For example, the percentage of the first element can be between 85 and 50 wt %, and the percentage of the second element can be between 15 and 50 wt %.

In some embodiments, the first element can include materials having enthalpy of oxide formation greater than 1200 kJ/mol in magnitude. The second element can include materials having enthalpy of oxide formation less than 600 kJ/mol in magnitude. The first and second elements can include materials having solubility of less than 100 ppm in weight in silver at temperature less than 500 C. The first and second elements can include materials having extinction coefficients less than 5. The first and second elements can include materials having extinction coefficients of the oxide forms to be less than 5.

In some embodiments, an underlayer can be formed under the first layer. In some embodiments, other layers can be formed on the second layer.

Figure 5:
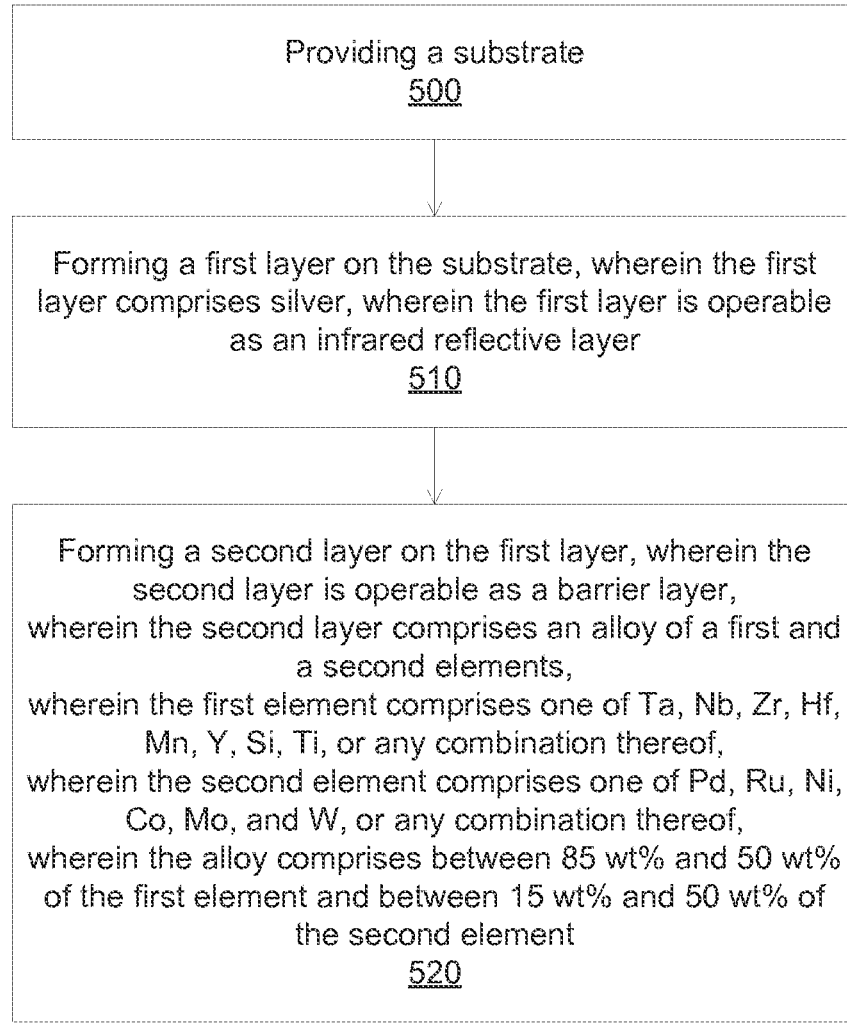
FIG. 5 illustrates a flow chart for sputtering coated layers according to some embodiments of the present invention.

FIG. 5 illustrates a flow chart for sputtering coated layers according to some embodiments. After forming a conductive layer on a substrate, such as a silver layer, a barrier layer can be sputtered deposited on the conductive layer. The barrier layer can include an alloy of first and second elements, wherein the first and second elements can be selected to improve, or at least, not degrade, the conductive layer. For example, the first element can be one of Ta, Nb, Zr, Hf, Mn, Y, Si, Ti, or any combination thereof. The second element can be one of Ru, Ni, Co, Mo, and W, or any combination thereof.

In operation 500, a substrate is provided. The substrate can be a transparent substrate, such as a glass substrate or a polymer substrate. Other substrates can also be used. In operation 510, a first layer is formed on the substrate. The first layer can be operable as an infrared reflective layer. The first layer can include a conductive material or a metallic material such as silver. The thickness of the first layer can be less than or equal to about 20 nm, or can be less than or equal to about 10 nm.

In operation 520, a second layer is sputter deposited on the first layer. The second layer can be operable as a barrier layer. The second layer can include an alloy of first and second elements. The first element can be one of Ta, Nb, Zr, Hf, Mn, Y, Si, Ti, or any combination thereof. The second element can be one of Ru, Ni, Co, Mo, and W, or any combination thereof. The alloy can have more first element than the second element. For example, the percentage of the first element can be between 85 and 50 wt %, and the percentage of the second element can be between 15 and 50 wt %.

In some embodiments, the alloy can include greater than 65 wt % of the first element. The alloy can include between 85 wt % and 65 wt % of the first element. The alloy can include less than 35 wt % of the second element. The alloy can include between 35 wt % and 15 wt % of the second element. The first element can include Nb or Ti, and wherein the second element can include Ni.

In some embodiments, the method can include forming a seed layer between the substrate and the first layer, wherein the seed layer comprises a crystal orientation that promotes a (111) crystal orientation of the first layer.

In some embodiments, an underlayer can be formed under the first layer. The underlayer can include seed layer having a crystal orientation that promotes a (111) crystal orientation of the first layer, e.g., the silver layer. For example, the underlayer can include ZnO having (002) crystal orientation, which can served as a template for growing (111) silver layer. In some embodiments, other layers can be formed on the second layer.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method to form a low emissivity coating, comprising:
providing a transparent substrate;
forming a first layer on the transparent substrate, wherein the first layer comprises silver, wherein the first layer is operable as an infrared reflective layer; and
forming a second layer directly on the first layer, wherein the second layer is operable as a barrier layer,
wherein the second layer comprises an alloy of a first element and a second element,
wherein the first element comprises one of Zr, Hf, or Mn,
wherein the second element comprises one of Ru, Ni, Co, Mo, or W,
wherein the alloy comprises between 85 wt % and 50 wt % of the first element and between 15 wt % and 50 wt % of the second element.

2. A method as in claim 1 wherein the percentage by weight of the first element is greater than the percentage by weight of the second element in the second layer.

3. A method as in claim 1 wherein the alloy comprises between 85 wt % and 65 wt % of the first element and between 15 wt % and 35 wt % of the second element.

4. A method as in claim 3 wherein the first element comprises one of Zr or Mn.

5. A method as in claim 4 wherein the second element comprises one of Ru, Ni, Mo, or W.

6. A method as in claim 5 wherein the first element comprises Mn.

7. A method to form a low emissivity coating, comprising:
providing a transparent substrate;
forming a first layer on the transparent substrate, wherein the first layer comprises silver, wherein the first layer is operable as an infrared reflective layer; and
forming a second layer directly on the first layer, wherein the second layer is operable as a barrier layer,
wherein the second layer consists of an alloy of a first element and a second element,
wherein the first element comprises one of Zr, Hf, or Mn,
wherein the second element comprises one of Ru, Ni, Co, Mo, or W,
wherein the alloy comprises between 85 wt % and 50 wt % of the first element and between 15 wt % and 50 wt % of the second element,
wherein the percentage by weight of the first element is greater than the percentage by weight of the second element in the second layer.

8. A method as in claim 7 wherein the alloy comprises greater than 65 wt % of the first element.

9. A method as in claim 7 wherein the alloy comprises between 85 wt % and 65 wt % of the first element.

10. A method as in claim 7 wherein the alloy comprises less than 35 wt % of the second element.

11. A method as in claim 9 wherein the alloy comprises between 35 wt % and 15 wt % of the second element.

12. A method as in claim 11 wherein the first element comprises one of Zr or Mn.

13. A method as in claim 12 wherein the second element comprises one of Ru, Ni, Mo, or W.

14. A low emissivity panel, comprising:
a transparent substrate;
a first layer disposed on the transparent substrate, wherein the first layer comprises silver, wherein the first layer is operable as an infrared reflective layer; and
a second layer disposed directly on the first layer, wherein the second layer is operable as a barrier layer,
wherein the second layer comprises an alloy of a first element and a second element, wherein the first element comprises one of Zr, Hf, or Mn, wherein the second element comprises one of Ru, Ni, Co, Mo, or W, wherein the alloy comprises between 85 wt % and 50 wt % of the first element and between 15 wt % and 50 wt % of the second element.

15. A panel as in claim 14 wherein the alloy comprises greater than 65 wt % of the first element.

16. A panel as in claim 14 wherein the alloy comprises between 85 wt % and 65 wt % of the first element.

17. A panel as in claim 14 wherein the alloy comprises less than 35 wt % of the second element.

18. A panel as in claim 16 wherein the alloy comprises between 35 wt % and 15 wt % of the second element.

19. A panel as in claim 18 wherein the first element comprises one of Zr or Mn.

20. A panel as in claim 19 wherein the second element comprises one of Ru, Ni, Mo, or W.

* * * * *